United States Patent
Burt

[19]

[11] Patent Number: 6,026,974
[45] Date of Patent: Feb. 22, 2000

[54] FLUID RESERVOIR-FUEL TANK ARRANGEMENT

[75] Inventor: Stephen J Burt, Hengoed, United Kingdom

[73] Assignee: Textron Automotive Co., Ltd., Mid Glamorgan, United Kingdom

[21] Appl. No.: 09/149,637

[22] Filed: Sep. 8, 1998

[30] Foreign Application Priority Data

Sep. 8, 1997 [GB] United Kingdom ................ 9719020.1

[51] Int. Cl.⁷ .................................................. B65D 21/028
[52] U.S. Cl. ........................ 220/564; 220/23.86; 220/23.4
[58] Field of Search ..................................... 220/562, 564, 220/567.2, 23.83, 23.86, 23.4; 280/834, 835

[56] References Cited

U.S. PATENT DOCUMENTS

| | | |
|---|---|---|
| 3,089,583 | 5/1963 | White .................................. 220/23.83 |
| 3,658,204 | 4/1972 | Bottger .................................. 220/23.4 |
| 3,847,241 | 11/1974 | Cameron et al. . |
| 4,013,300 | 3/1977 | Berger . |
| 4,592,478 | 6/1986 | Laconis ................................. 220/23.83 |
| 4,950,083 | 8/1990 | Bavaveas ................................. 366/348 |
| 5,022,547 | 6/1991 | Spangler et al. ....................... 220/23.4 |
| 5,050,755 | 9/1991 | Strawder ............................... 220/23.4 |
| 5,123,460 | 6/1992 | Reed ........................................ 141/95 |

FOREIGN PATENT DOCUMENTS

| | | |
|---|---|---|
| 0 182 980 | 8/1985 | European Pat. Off. . |
| 279592 | 11/1927 | United Kingdom . |
| 2 229 686 | 2/1990 | United Kingdom . |

Primary Examiner—Stephen Castellano
Attorney, Agent, or Firm—Reising, Ethington, Barnes, Kisselle et al

[57] ABSTRACT

A fluid reservoir—fuel tank arrangement comprises a fluid reservoir module (1) and a fuel tank module (3) connected to the fluid reservoir module (1) via connecting elements (25, 27, and 29) provided for connecting the two modules (1 and 3) together in juxtaposed relationship.

18 Claims, 6 Drawing Sheets

FLUID RESERVOIR-FUEL TANK ARRANGEMENT

TECHNICAL FIELD

This invention relates to a fluid reservoir—fuel tank arrangement.

BACKGROUND OF THE INVENTION

Screen wash and other refillable reservoirs have been traditionally located in the engine compartment of most automotive vehicles, particularly cars and small to medium sized vans. With modern car and like construction, the space in the engine compartment has become more and more limited because of increasing demands to be made of it in the way of additional components such as turbochargers, air conditioning systems. Also, it is necessary, due to the restricted room available to make each reservoir a custom shape for each vehicle. Therefore it is eminently desirable to move whatever components can be located satisfactorily elsewhere.

One such item is the various fluid reservoirs, particularly those used for holding wash liquid for washing windscreens or headlights.

Another problem with fluid reservoirs is the necessity and often inconvenience in filling them. Mostly the filling arrangements have been located in the engine compartment of the vehicle. However, this is a dirty area of the vehicle and it is almost impossible to fill the fluid reservoirs to avoid getting some dirt on ones hands or clothes. Thus, again, movement of the fluid reservoirs away from the engine compartments would be an advantage.

SUMMARY OF THE INVENTION

The present invention therefore seeks to provide a fluid reservoir which can be situated elsewhere in the vehicle, and, in the present case, situated in a position in combination with the petrol or other fuel tank of a vehicle.

According to the invention, there is provided a fluid reservoir—fuel tank arrangement comprising a fluid reservoir module, a fuel tank module and connecting means for connecting the two modules in juxtaposed relationship.

Preferably the fuel tank module has an indentation in which the fluid reservoir module sits and the fluid reservoir module may thus be surrounded on three sides by the fuel tank module.

This permits the use of a standard shape of reservoir with any desired shape of fuel tank, thus cutting down on the number of parts having customized shapes which are needed for each vehicle. It is also possible to pre-assemble the standard reservoir to customized fuel tanks prior to supply to a motor manufacturer.

BRIEF DESCRIPTION OF THE DRAWINGS

The invention will now be described in greater detail, by way of example, with reference to the drawings, in which.

DETAILED DESCRIPTION OF THE PREFERRED EMBODIMENT

In the embodiment shown, the invention is applied to a fluid reservoir for containing screen wash liquid for washing the front and rear windscreens and optionally the head lights of a car.

Figure 1:
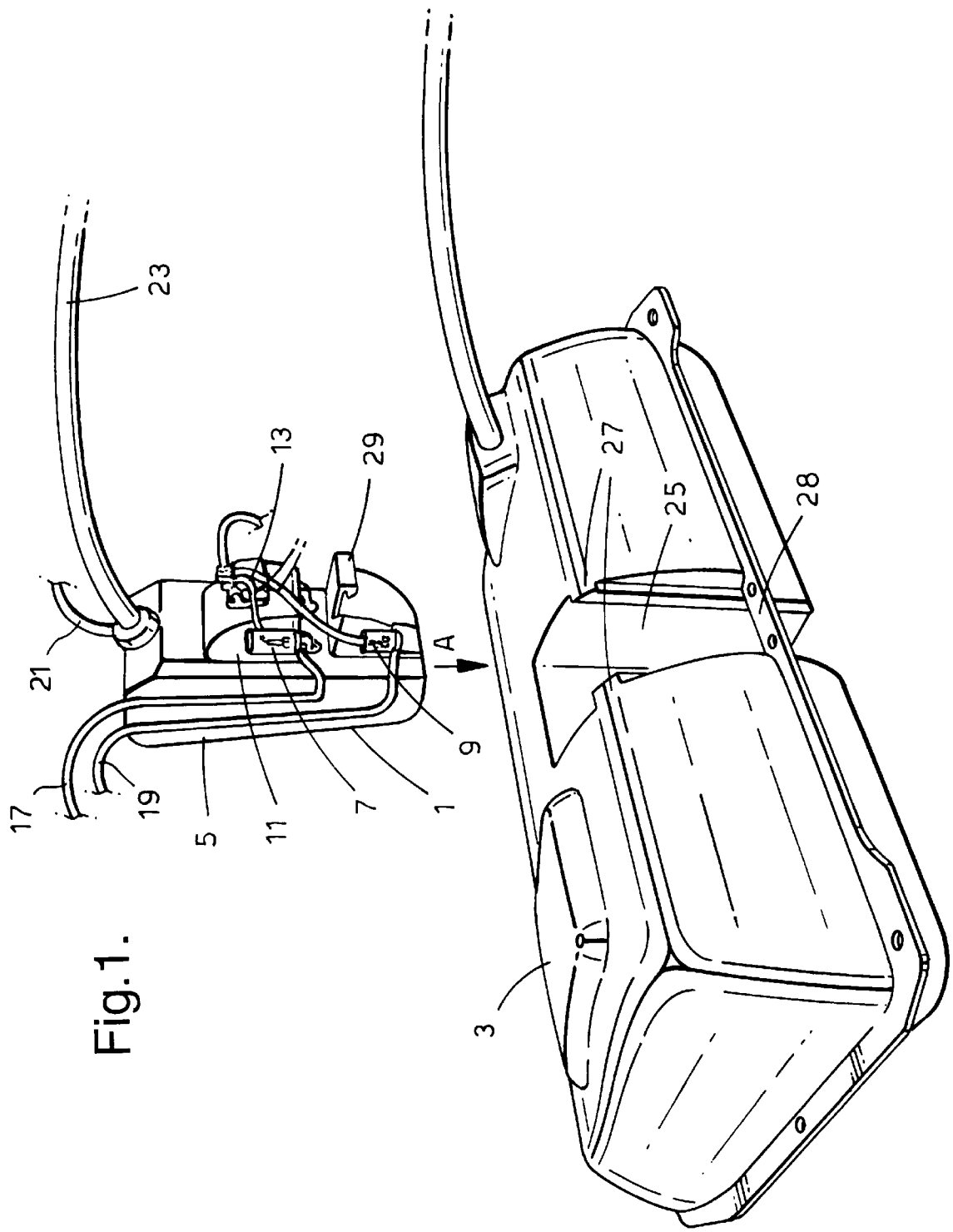
FIG. 1 is an exploded view of a fluid reservoir and a fuel tank, in accordance with the invention, prior to fitting together.

Referring firstly to FIG. 1, the fluid reservoir module 1, often called a "wash bottle", can be seen, together with the fuel tank module 3 with which it is associated in an exploded view.

The fluid reservoir module 1 comprises a container portion 5, and two fluid pumps 7 and 9 located on the front of the container 5. The pump 7 is located in the side of a protrusion 11 to which is also attached the controlling circuitry 13. The pump 9 is mounted in the side of a second protrusion 12 located below the protrusion 11. A third pump, 14 which cannot be seen in this figure is also provided, in line with the first pump 7 but on the opposite side of a protrusion 11. The pumps are suitably attached to the container 5 by overcentre snap catches as will be described hereafter in connection with FIG. 6. Other methods of attachment may be used. Feed to each of the pumps is by a snap in connector boss 15, suitably using a grommet (not shown) to provide a liquid tight seal. Suitably the inlet connector bosses may have extension pipes at the end thereof so that the extension pipes extend to the bottom of the container 5 so that feed to the pumps is always from the bottom of the container 5 ensuring that the full volume of the container 5 is available for use. Fluid supply pipes from the pumps are shown at 17, 19 and 21 and a filler pipe, of significantly larger diameter, for filling the container is shown at 23.

The container 5 is of a slightly downwardly tapered shape and when it is assembled to the fuel tank module 3, it is received in an indentation in the fuel tank module in the form of a channel with a reducing width in the downward direction. This enables the container 5 to be slid downwards into the channel 25 without it being able to fall straight through the channel 25. In order to secure the container 5 in the channel 25, the channel 25 is provided with a pair of opposed ribs 27 which will, in the assembled state of the container 5, be located in front of the largest width part of the container 5 so as to prevent it from moving forwardly out of the channel 25 without in any way hindering access to the various parts of the container to which connections need to be made.

Final locking of the container 5 in the channel 25 is achieved by means of a flange 28 which passes across the opening of the channel and cooperates with a snap on retainer 29 molded on or otherwise provided on the container 5.

Figure 2:
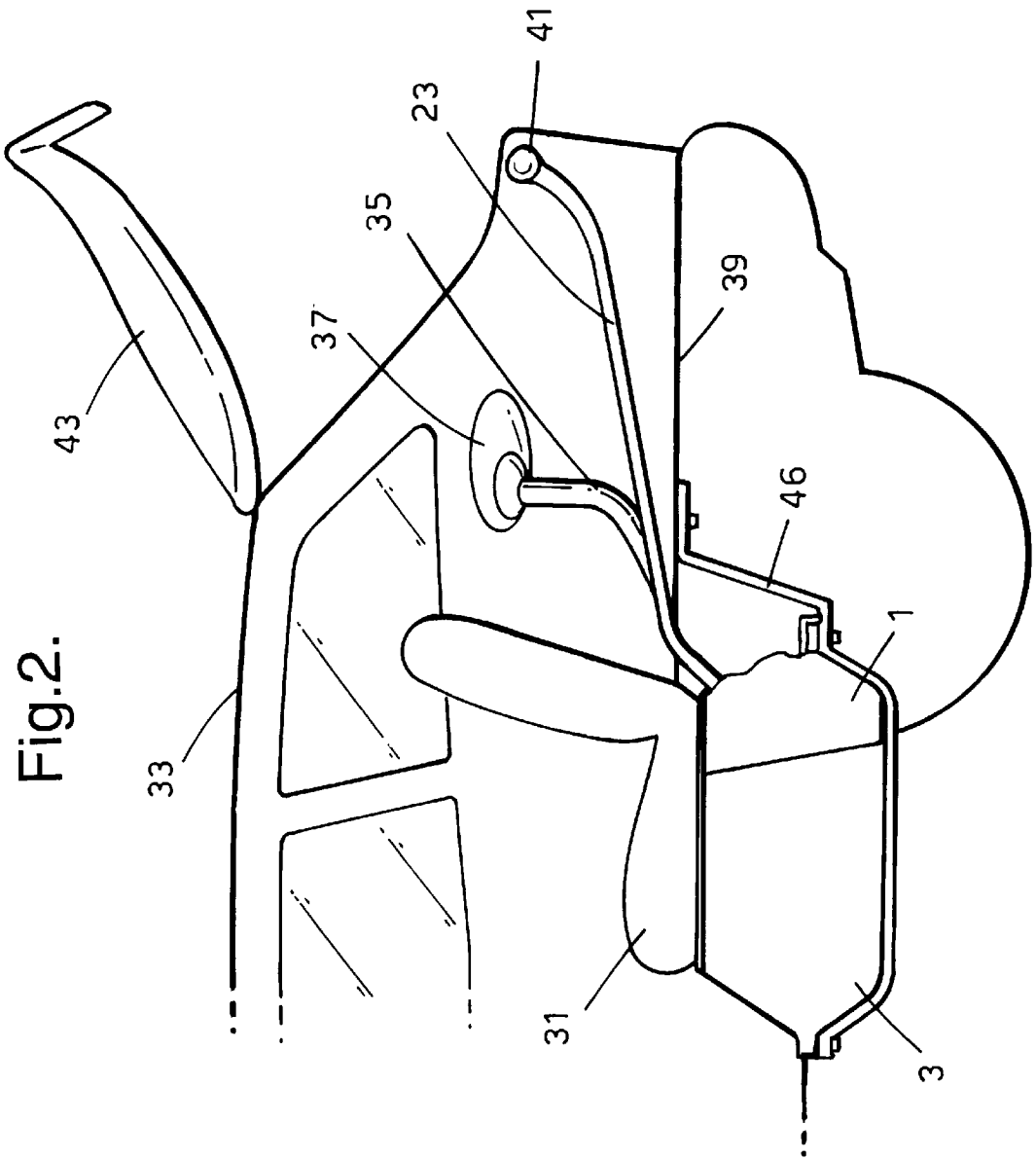
FIG. 2 is a diagrammatic view of the fluid reservoir fuel tank assembly mounted beneath the rear seat of a vehicle.
Figure 3:
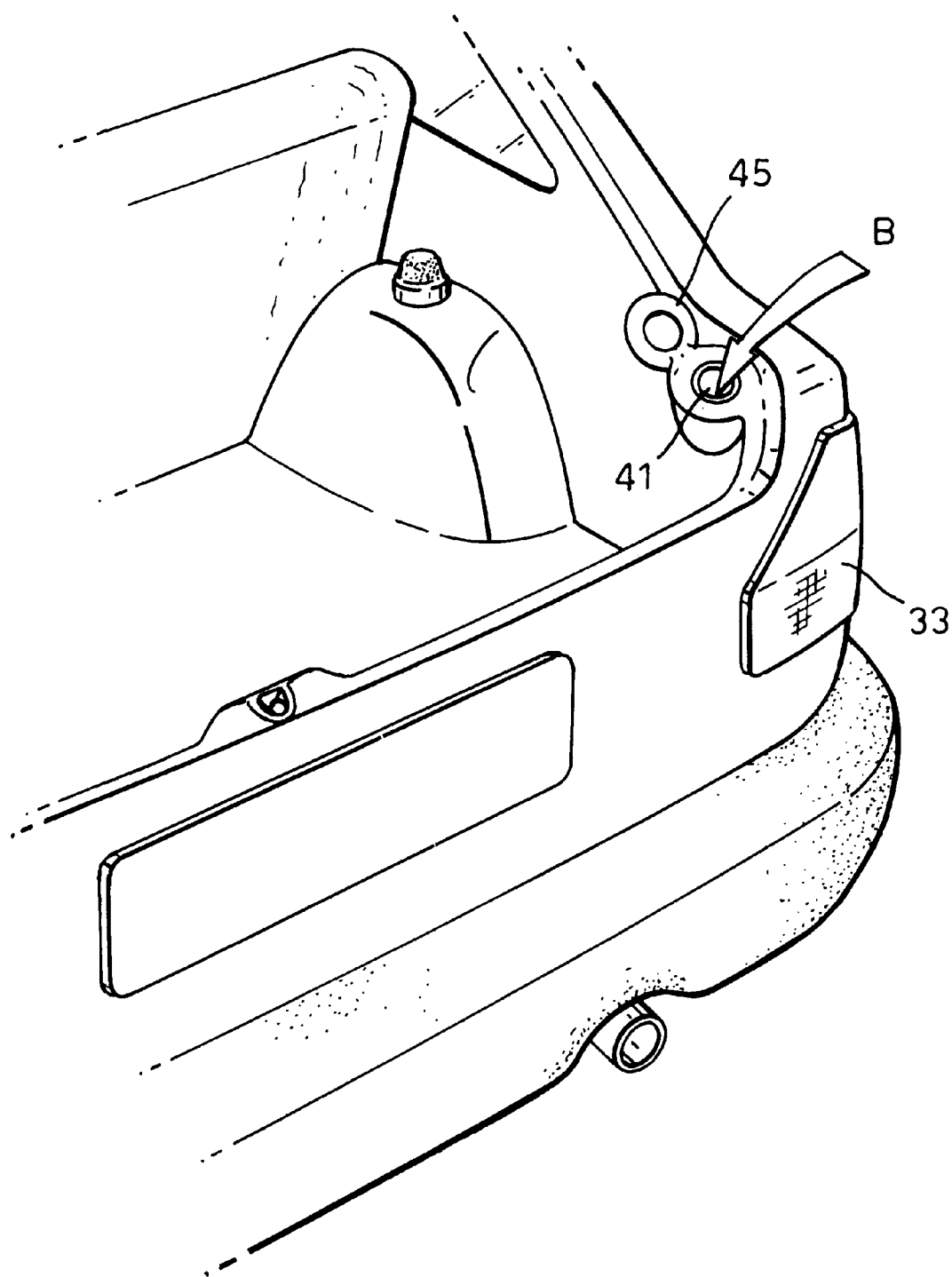
FIG. 3 is a perspective view of a part of the rear of a vehicle showing the location of the filler for the fluid reservoir.

FIG. 2 shows diagrammatically a suitable arrangement for the fluid reservoir—fuel tank arrangement shown in FIG. 1. In the present instance, the fuel tank 3 is located beneath the rear seat 31 of the five door vehicle, only the rear end of which is shown at 33. In the diagrammatic illustration shown, the relative position of the fluid reservoir module 1 is clearly indicated. As can be seen from the figure, the fuel tank filler pipe 35 is routed to the outside of the vehicle enabling the tank to be filled through a filler arrangement 37 in the usual way. The filler pipe 23 of the fluid reservoir module 1 is routed through the vehicle underbody 39 and around the periphery of the boot space to end in a filler arrangement 41 located just behind the rear door opening so as to be accessible once the rear door 43 has been raised. The location of the filler arrangement 41 can be seen particularly clearly in FIG. 3. As can be seen, the filler arrangement 41 is closed by a sealing flap 45 which prevents the contents of the container 5 being spilt into the luggage space or in the near vicinity when the container 5 is full.

To prevent venting problems, should they occur, an additional smaller pipe (not shown) may be run from the highest point of the container 5 alongside the filler pipe 23 to ensure free flow of fluid into the container even if the filling arrangement 41 is located a relatively long distance from the container 5. Not only does this additional venting pipe prevent air locks from occurring but also allows washing fluid to be freely drawn from the container 5 by the pumps 7, 9 and 14.

The entire assembly of the fluid reservoir—fuel tank arrangement is retained in position in the vehicle by means of a steel strap 46 which forces the upper surface of the arrangement against the vehicle underbody 39 to ensure that both the fluid reservoir module 1 and the fuel tank module 3 are adequately retained. Gluing or other mechanical devices may alternatively be used for this purpose.

Figure 4:
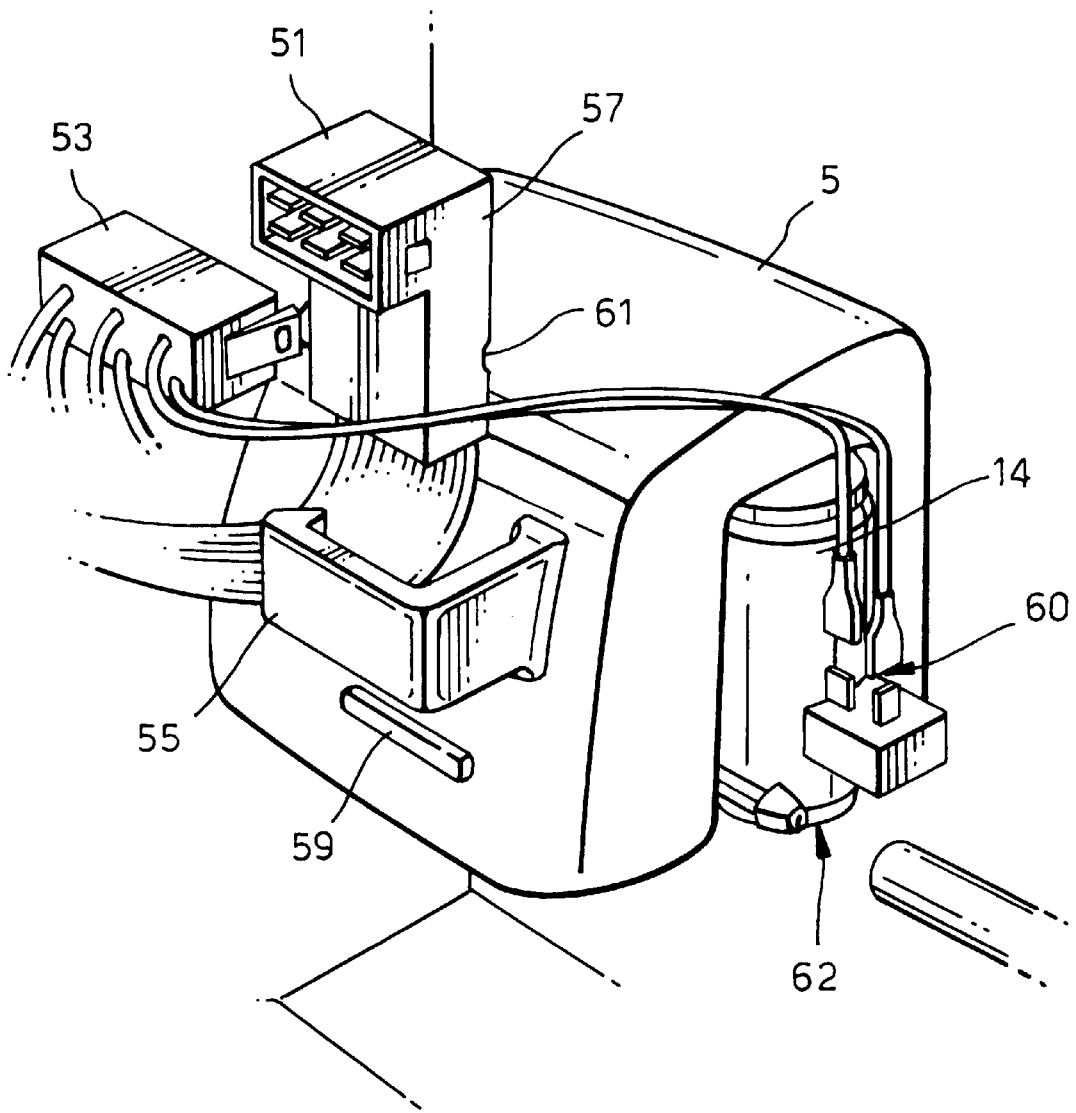
FIG. 4 is a perspective view of a detail of the fluid reservoir showing electrical components and pump assemblies.

FIG. 4 shows a detail of the container 5 showing the arrangement of the electrical components and pump assemblies. The power supplied to the fluid pumps 7, 9 and 14 is channeled through a two part composite connector 51 which allows a single operation to connect the power of the vehicle to the pumps. The female half 53 of the composite connector 51 is connected to the respective pumps 7, 9 and 14 prior to the assembly of the fluid reservoir module 1 to the fuel tank module 3.

The composite connector 51 may be fixed to the protrusion 11 of the container 5 by gluing or by mechanical fixing. In the example shown here, an arm 55 is used to hold the main body 57, the connector 51 being further retained by means of a localized raised section 59 which mates with a corresponding recess 61 in the main body 57 of the connector 51.

In FIG. 4, only the pump 14 is shown, its electrical connections to the power supply from the composite connector 51 being shown at 60 and its pipework connection being shown at 62.

Figure 5:
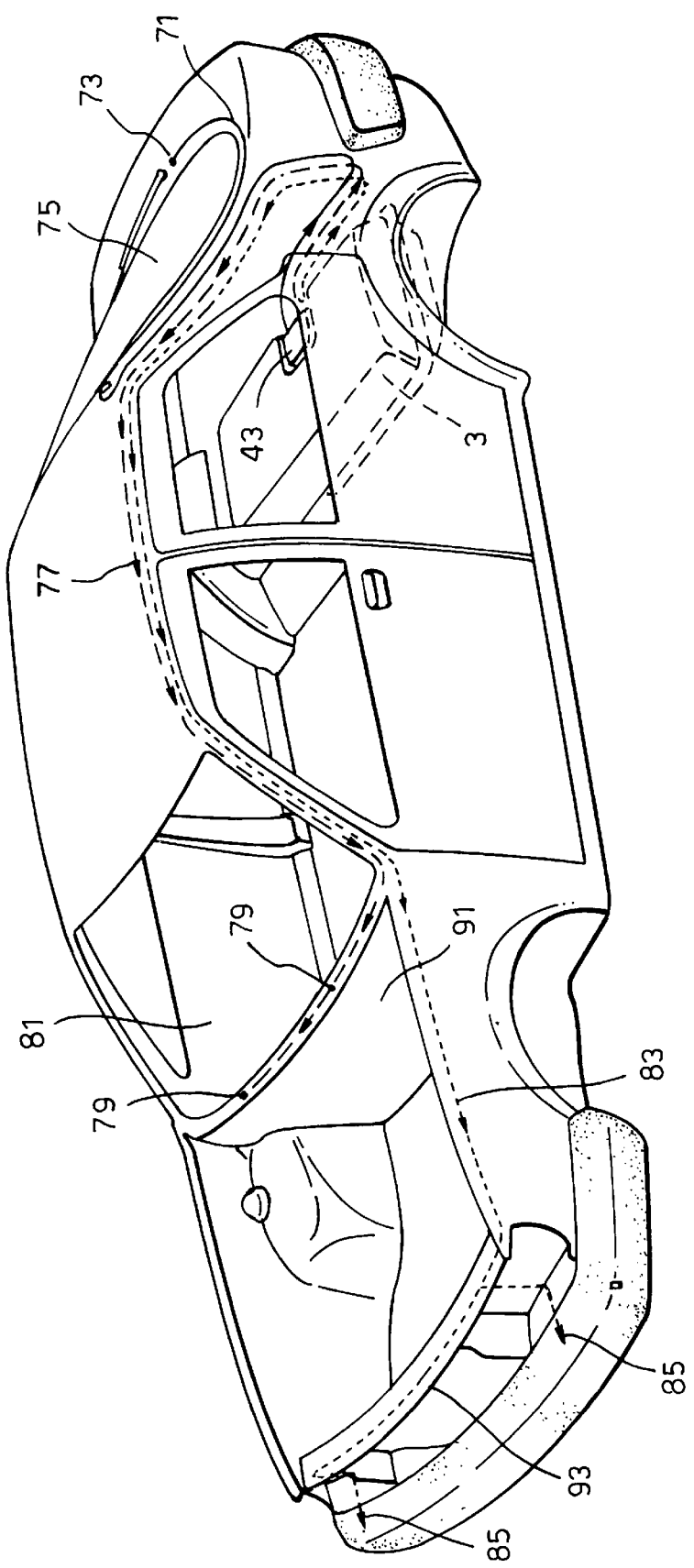
FIG. 5 is a perspective view of a vehicle body on which a suitable piping route for the transmission of the fluid to appropriate parts of the vehicle.

FIG. 5 shows an example of the paths which may be followed by the pipework supplying washing fluid to the washer nozzles. As shown, three separate paths are provide. One, shown in full lines at 71, feeds the nozzle 73 for the rear windscreen 75. A second, shown in broken lines at 77, feeds the two nozzles 79 for the front windscreen 81 while a third, shown in dotted lines at 83, feeds the two nozzles 85 for the head lamps. Each of these paths is fed by a single one of the pumps 7, 9 and 14.

Thus, the pipework 71 for the rear screen runs from its pump along the rear upper surface of the fuel tank 3 (thus avoiding close proximity to the vehicle exhaust pipe (not shown). The pipework would then pass up the adjacent pillar to the vehicle head lining, running beneath the head lining to the rear door 43 and so to the spray jet 73.

The front windscreen pipework 77 is fed from its pump up the appropriate pillar and beneath the head lining to the front of the vehicle. There, it passes down the appropriate pillar, through the bulkhead 91 and across the vehicle to the spray jets 79.

The pipework 83 for the headlamps follows the same route as the pipework 77 but, at the bulkhead 91, it continues along the exterior of the engine compartment to the front upper cross beam 93 to the headlamp spray nozzles 85.

Figure 6:
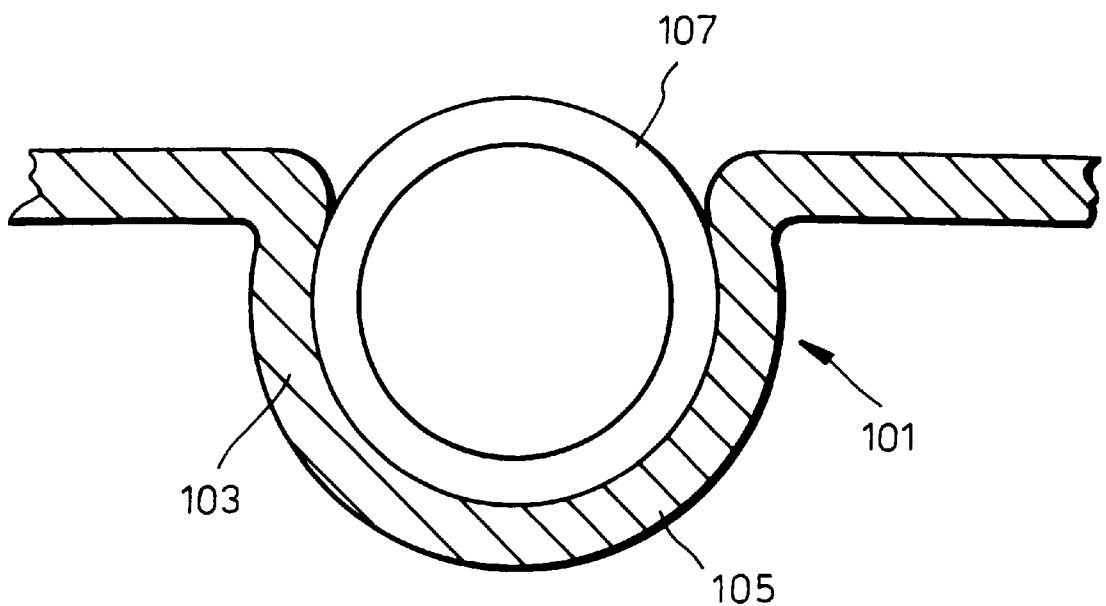
FIG. 6 is a sectional view of an overcentre snap arrangement suitable for retaining components on the fluid reservoir module.

FIG. 6 shows a suitable form of overcentre snap connector 101 which can be used both for mounting the pumps 7, 9 and 14, and, in a different size, for retaining the pipework 71, 77 and 83. Thus the connector 101 is in the form of a resiliently formed strap 103 having a loop 105 to surround the member 107 being held thereby. As can be seen, the loop 105 has an opening 109 which is somewhat smaller than the member 107 so that it can be snapped onto the member 107, thus retaining it in the loop 105, the strap 103 itself is fastened, suitably by its ends, to the structure to which the member 107 is to be secured.

It will be appreciated that the above describes only one embodiment of a fluid reservoir-fuel tank arrangement and many other possibilities exist within the scope of the appended claims. For example, the exact location of the fuel tank is immaterial and the invention can be applied to any suitable fuel tank wherever this may be located. The routing of the various pipework will depend on the particular construction of the vehicle on which the invention is used. In some cases, only two of the pumps will be needed where, for example, no headlamp washers are provided. On a saloon car, which does not have a rear wash wipe system only one pump may be required.

In a further alternative one pump may carry out more than one function. Thus the function of front windscreen washer and headlamp washer may be combined.

The fixing of the fuel reservoir module to the fuel tank module may be carried other means, such as gluing.

It will also be understood that while the fluid reservoir described has been for the windscreen and headlight washing fluid, the fluid reservoir could be used as a reservoir for any other liquids which may be required to be topped up. It is even feasible to imagine that in some circumstances, more than one fluid reservoir could be provided, each containing a fluid for different purposes.

From the above, it will be appreciated that the above described embodiment allows the use of a standard shape of reservoir which can be used in any shape of fuel tank. Thus the number of components having to have a customized shape for each vehicle can be reduced. The above described embodiments also allow for a fuel tank and reservoir to be supplied to a motor manufacturer in a pre-assembled form, thus reducing the number of operations needed to be carried out by the motor manufacturer.

What is claimed is:

1. A fluid reservoir-fuel tank arrangement comprising a fluid reservoir module, and a fuel tank module connected to the fluid reservoir module in juxtaposed relationship, the fuel tank module having an indention in the form of a channel in which the fluid reservoir sits, said channel extends from the top of the fuel tank module to the bottom thereof and in which the fluid reservoir module is slideably receivable, and wherein the fluid reservoir module is surrounded on three sides by the fuel tank module.

2. An arrangement as claimed in claim 1, wherein the channel is tapered inwardly from the top to the bottom of the fuel tank module and the fluid reservoir has at least a part thereof with a generally complementary taper so as to be slidable therein for assembly and disassembly.

3. An arrangement as claimed in claim 2, wherein the side walls of the channel adjacent to its open side each have a longitudinally extending rib protruding into the channel and so arranged as to retain the tapered part of the fluid reservoir module between the ribs and the base of the channel.

4. An arrangement as claimed in claim 3, wherein the fuel tank module has a bar extending transversely of the mouth of the channel which cooperates with a stop member on the fluid reservoir module so as to retain the fluid reservoir module in a particular longitudinal position within the channel.

5. An arrangement as claimed in claim 4, wherein the stop member is in the form of a snap on element which, when it is in the required position in relationship to the bar, can be snapped thereonto.

6. An arrangement as claimed in claim 2, wherein the fuel tank module has a bar extending transversely of the mouth of the channel which cooperates with a stop member on the fluid reservoir module so as to retain the fluid reservoir module in a particular longitudinal position within the channel.

7. An arrangement as claimed in claim 1, wherein the side walls of the channel adjacent to its open side each have a longitudinally extending rib protruding into the channel and so arranged as to retain the tapered part of the fluid reservoir module between the ribs and the base of the channel.

8. An arrangement as claimed in claim 7, wherein the fuel tank module has a bar extending transversely of the mouth of the channel which cooperates with a stop member on the fluid reservoir module so as to retain the fluid reservoir module in a particular longitudinal position within the channel.

9. An arrangement as claimed in claim 1, wherein the fuel tank module has a bar extending transversely of the mouth of the channel which cooperates with a stop member on the fluid reservoir module so as to retain the fluid reservoir module in a particular longitudinal position within the channel.

10. A fluid reservoir-fuel tank arrangement comprising a fluid reservoir module, and a fuel tank module connected to the fluid reservoir module in juxtaposed relationship;

wherein the fuel tank module has an indention in which the fluid reservoir module sits;

wherein the indention in the fuel tank module is in the form of a channel which extends from the top of the fuel tank module to the bottom thereof.

11. An arrangement as claimed in claim 10, wherein the channel is tapered inwardly from the top to the bottom of the fuel tank module and the fluid reservoir has at least a part thereof with a generally complementary taper so as to be slidable therein for assembly and disassembly.

12. An arrangement as claimed in claim 11, wherein the side walls of the channel adjacent to its open side each have a longitudinally extending rib protruding into the channel and so arranged as to retain the tapered part of the fluid reservoir module between the ribs and the base of the channel.

13. An arrangement as claimed in claim 12, wherein the fuel tank module has a bar extending transversely of the mouth of the channel which cooperates with a stop member on the fluid reservoir module so as to retain the fluid reservoir module in a particular longitudinal position within the channel.

14. An arrangement as claimed in claim 13, wherein the stop member is in the form of a snap on element which, when it is in the required position in relationship to the bar, can be snapped thereonto.

15. An arrangement as claimed in claim 11, wherein the fuel tank module has a bar extending transversely of the mouth of the channel which cooperates with a stop member on the fluid reservoir module so as to retain the fluid reservoir module in a particular longitudinal position within the channel.

16. An arrangement as claimed in claim 15, wherein the stop member is in the form of a snap on element which, when it is in the required position in relationship to the bar, can be snapped thereonto.

17. An arrangement as claimed in claim 10, wherein the fuel tank module has a bar extending transversely of the mouth of the channel which cooperates with a stop member on the fluid reservoir module so as to retain the fluid reservoir module in a particular longitudinal position within the channel.

18. An arrangement as claimed in claim 17, wherein the stop member is in the form of a snap on element which, when it is in the required position in relationship to the bar, can be snapped thereonto.

* * * * *